(12) United States Patent
Brennan (10) Patent No.: US 10,865,015 B2
(45) Date of Patent: Dec. 15, 2020

(54) STORAGE CONTAINER SECURING SYSTEM (71) Applicant: APEX COOLERS, LLC, Dallas, TX (US)

(72) Inventor: Sean Brennan, Dallas, TX (US)

( * ) Notice: Subject to any disclaimer, the term of this patent is extended or adjusted under 35 U.S.C. 154(b) by 0 days.

(21) Appl. No.: 16/392,520

(22) Filed: Apr. 23, 2019

(65) Prior Publication Data

US 2019/0315519 A1 Oct. 17, 2019

Related U.S. Application Data

(63) Continuation-in-part of application No. 29/679,871, filed on Feb. 11, 2019, now Pat. No. Des. 874,357, which is a continuation of application No. 29/605,327, filed on May 25, 2017, now Pat. No. Des. 840,281.

(60) Provisional application No. 62/661,143, filed on Apr. 23, 2018.

(51) Int. Cl.
*B65D 25/20* (2006.01)
*B63B 17/00* (2006.01)
*B60R 9/06* (2006.01)
*E05B 67/38* (2006.01)

(52) U.S. Cl.
CPC ............... *B65D 25/20* (2013.01); *B60R 9/06* (2013.01); *B63B 17/00* (2013.01); *E05B 67/383* (2013.01)

(58) Field of Classification Search
CPC .. B60P 7/06; B60P 7/08; B60P 7/0892; B60P 7/10; B60D 1/583; B62B 2203/44; B65D 25/20
See application file for complete search history.

(56) References Cited

U.S. PATENT DOCUMENTS

| | | | | |
|---|---|---|---|---|
| 3,504,404 | A * | 4/1970 | Strombeck | B66C 1/10 24/16 R |
| 4,200,046 | A * | 4/1980 | Koliba | B60P 7/0892 410/94 |
| 5,137,405 | A * | 8/1992 | Klein | B60P 7/08 410/104 |
| 5,976,672 | A * | 11/1999 | Hodgetts | B32B 27/32 428/116 |
| 6,511,270 | B1 * | 1/2003 | Burke | B60P 7/0807 410/101 |
| 8,622,266 | B2 * | 1/2014 | McMillan | B60R 3/007 224/323 |
| 9,067,521 | B1 * | 6/2015 | Masanek, Jr. | B60R 11/00 |
| 9,199,657 | B2 * | 12/2015 | Martin | B62B 5/0083 |
| 9,278,704 | B2 * | 3/2016 | Cates | B62B 5/0089 |
| 9,415,787 | B2 * | 8/2016 | Mericle | B62B 3/02 |
| 9,694,838 | B2 * | 7/2017 | Gullino | B62B 3/001 |
| 9,878,841 | B2 * | 1/2018 | Holderness | B67D 3/0067 |
| 9,919,642 | B2 * | 3/2018 | Llewellyn | B60P 7/0892 |
| 10,138,047 | B2 * | 11/2018 | Seiders | B65D 25/2808 |
| 10,227,047 | B2 * | 3/2019 | Purvis | B65D 71/72 |
| 10,384,589 | B2 * | 8/2019 | Llewellyn | B60P 7/06 |
| 10,392,043 | B2 * | 8/2019 | Guerdrum | B62B 3/10 |
| 2019/0247995 | A1 * | 8/2019 | Hocine | B25H 3/028 |
| 2019/0329714 | A1 * | 10/2019 | Masanek, Jr. | B60R 5/04 |

\* cited by examiner

*Primary Examiner* — Bradley Duckworth
(74) *Attorney, Agent, or Firm* — Bell Nunnally & Martin LLP (57) ABSTRACT

A storage container securing system, in one embodiment, may include a base for receiving container brackets configured to matingly engage opposite surfaces of a storage container.

17 Claims, 10 Drawing Sheets

STORAGE CONTAINER SECURING SYSTEM

CROSS-REFERENCE TO RELATED APPLICATIONS

The present application claims the benefit under 35 U.S.C. § 119(e) of U.S. Provisional Patent Application Ser. No. 62/661,143, filed Apr. 23, 2018, entitled "Storage Container Securing System," which is hereby incorporated by reference for all purposes. The present application claims the benefit under 35 U.S.C. § 120 of U.S. Design patent application Ser. No. 29/679,871, filed Feb. 11, 2019, entitled "Container Bracket," which is a continuation of U.S. Design patent application Ser. No. 29/605,327 (now U.S. Design Pat. No. D840,281), filed May 25, 2017, entitled "Container Bracket," each of which is hereby incorporated by reference for all purposes.

BACKGROUND

Technical Field

This disclosure relates to a system to secure a storage container at a location.

History of Related Art

Coolers and other storage containers are often stored in open environments where they are accessible to users. For example, coolers are often stored in an open truck bed of a pickup truck so that the cooler is easily accessible to users. Unfortunately, storing a cooler or other storage container in an open environment, such as a truck bed, occasionally permits those with poor intentions to access the cooler and/or steal the cooler. Stolen coolers and other storage containers are expensive and inconvenient to replace. It would be beneficial to have a mechanism for securing a cooler or other storage container to a surface of an open environment, such as a truck, boat, or UTV, so the container cannot be easily stolen and so that the contents of the container are still easily accessible to the container owner.

SUMMARY OF THE INVENTION

In a first aspect, there is provided a storage container securing system that includes a base, first and second brackets mountable to the base for abutting opposite ends of a storage container. In some embodiments, the storage container may include a recess on each of the opposite ends, wherein the first and second brackets are configured to slidably fit within the recess. The system may also include first and second coupling members that secure the storage container to the first and second brackets.

In a second aspect, there is provided a storage container securing system that includes a storage container having slots on opposite ends thereof for receiving container brackets positioned on a base to secure the storage container. In some embodiments, the container brackets may be removably secured to the base. The system may also include a coupling member that is coupleable to a storage container to secure the storage container to the one or more container brackets. The coupling member may include a locking member.

Other aspects, features, and advantages will become apparent from the following detailed description when taken in conjunction with the accompanying drawings, which are part of this disclosure and which illustrate, by way of example, principles of the inventions disclosed.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
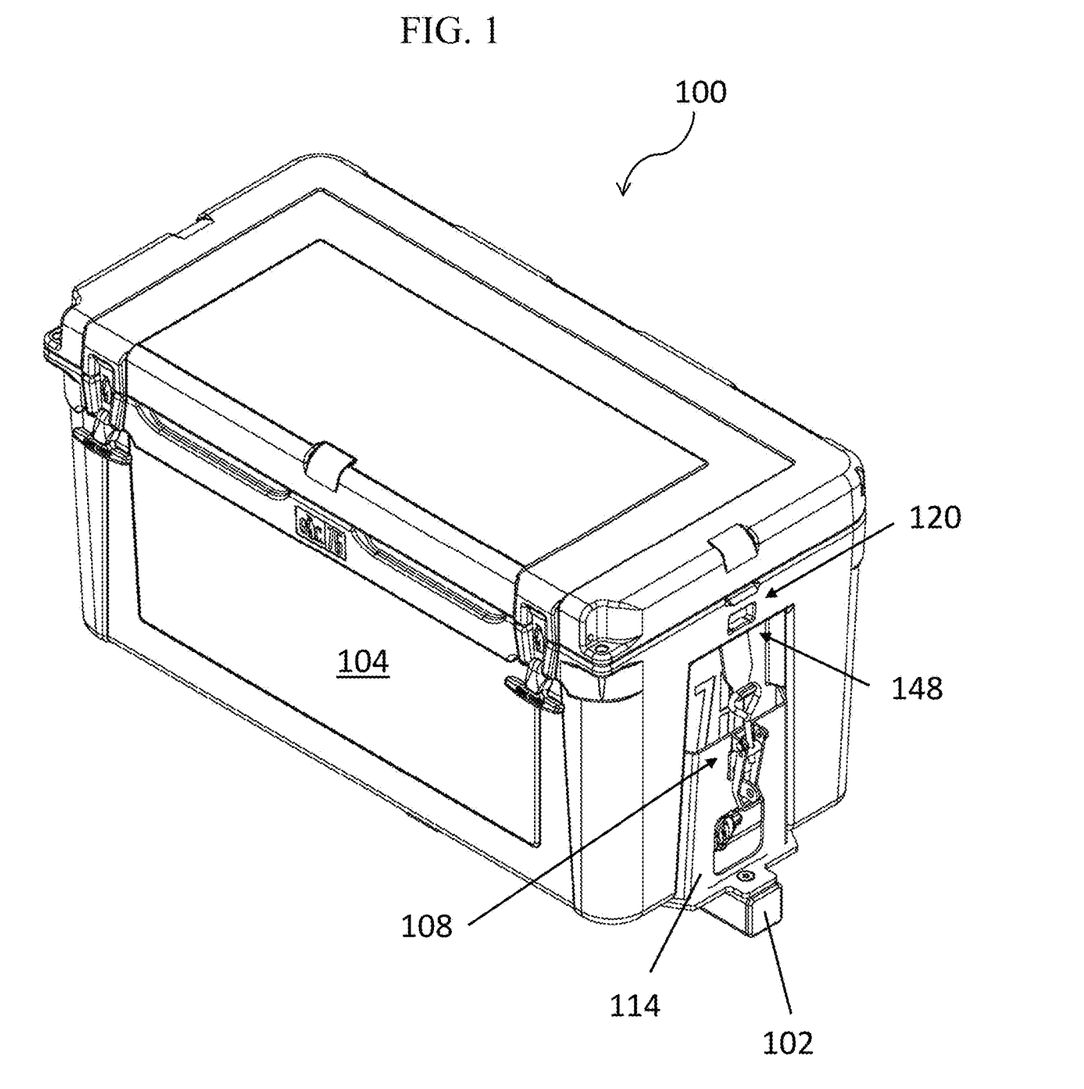
FIG. 1 is a perspective view of an embodiment of a storage container securing system secured to an object in accordance with this disclosure.

FIG. 1 illustrates an embodiment of a securing system 100 that includes a base 102 for securing a storage container 104, such as a cooler, toolbox, or other container; one or more container brackets 114, and one or more coupling members 108 to couple the storage container 104 to the base 102. The securing system 100 may be configured to be mounted to a surface located in an open environment, such as a generally flat surface of a truck bed, boat hull, or other object, so that a storage container 104 located in the securing system 100 is easily accessible to the container owner and other users. The storage container 104 is secured to the securing system 100 so that a lid of the container 104 may still be accessible to the container owner while the container 104 is secured to the system 100. As will be described in more detail below, in some embodiments, a user can secure a storage container 104 to the securing system 100 by securing the coupling members 108 to latches 148 inserted through pre-existing slots 120 in the storage container 104. The user can then easily lock the securing system 100 to the container 104 by securing the coupling members 108 with a locking device, such as a combination lock (not shown). Thus, the securing system 100 facilitates securement of the container 104 to the base 102 while also facilitating easy removal of the container 104 from the base 102.

Figure 2:
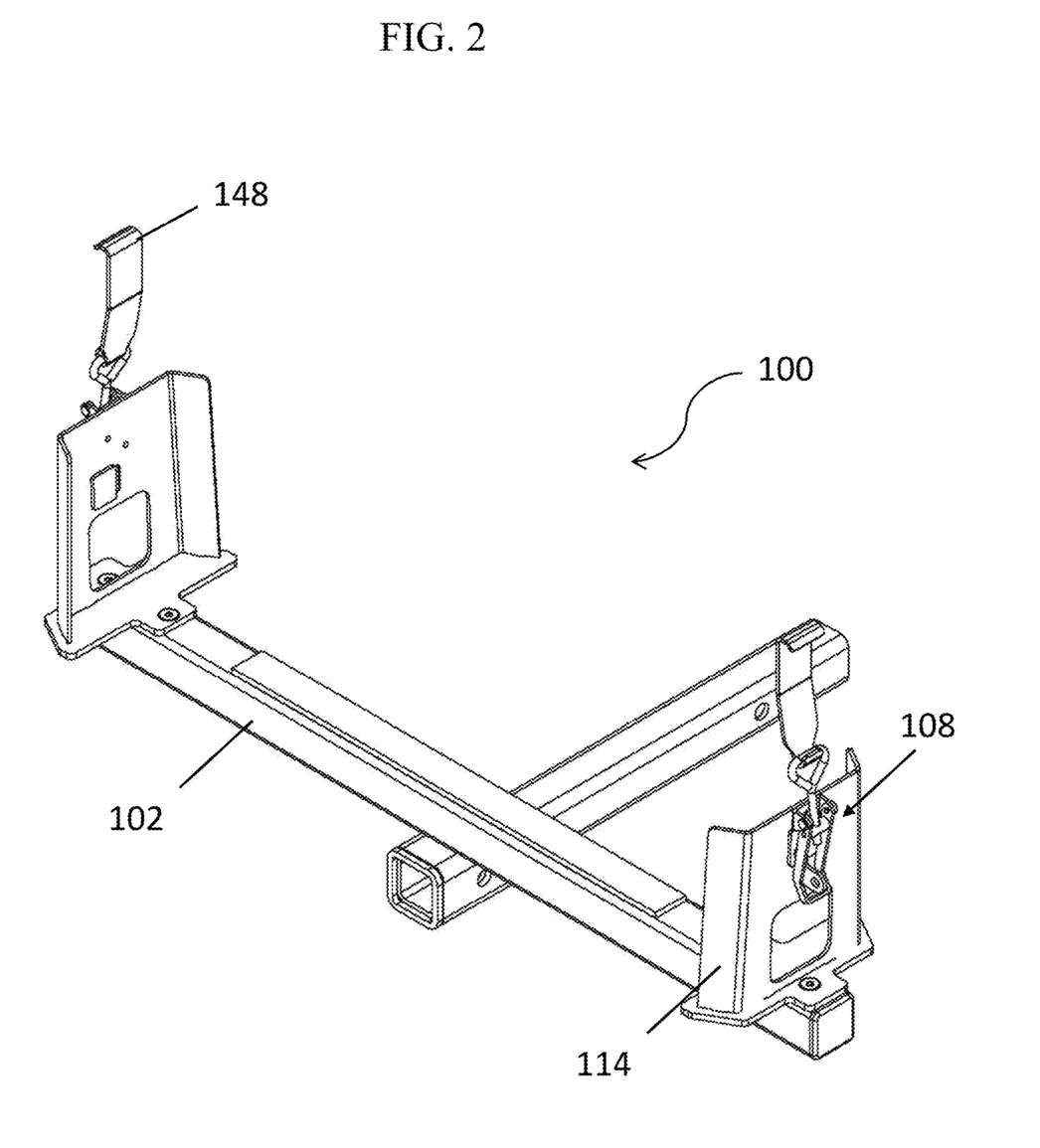
FIG. 2 is a perspective view of an embodiment of a storage container securing system in accordance with this disclosure.

Referring now to FIG. 2, an embodiment of the securing system 100 is shown configured to receive a bottom portion of a storage container when the storage container is positioned on the base 102. In some embodiments, the container brackets 114 may be adjustable within the base 102 by being secured closer together or farther apart depending on the specifications of the storage container. In other embodiments, the floor contacting portion may extend across the entire base 102. In other embodiments, the base 102 has other shapes and sizes to conform to the shape and size of various storage containers, such as coolers, plastic containers, metal containers, or other containers with or without recesses on opposite sides thereof. As shown in FIG. 2, the base 102, the container brackets 114, the coupling members 108, and the locking straps 148 are shown in an assembled configuration with the container 104 removed for clarity.

The foregoing describes only some embodiments of the invention(s), and alterations, modifications, additions and/or changes can be made thereto without departing from the scope and spirit of the disclosed embodiments, the embodiments being illustrative and not restrictive. For example, while in some embodiments a user couples the securing system 100 to a separate surface, for example by securing the system 100 to a bed of a pickup truck with one or more bolts, in other embodiments some of the components of the securing system 100 are integrally formed with a separate surface, such as, the bed of a pickup truck. For example, in some embodiments the container brackets 114 may be secured directly to a surface, such as a truck bed. In other embodiments, other features of the securing system 100 are integrated into a truck bed or other surface to secure a container 104 to the truck bed or other surface.

Figure 3:
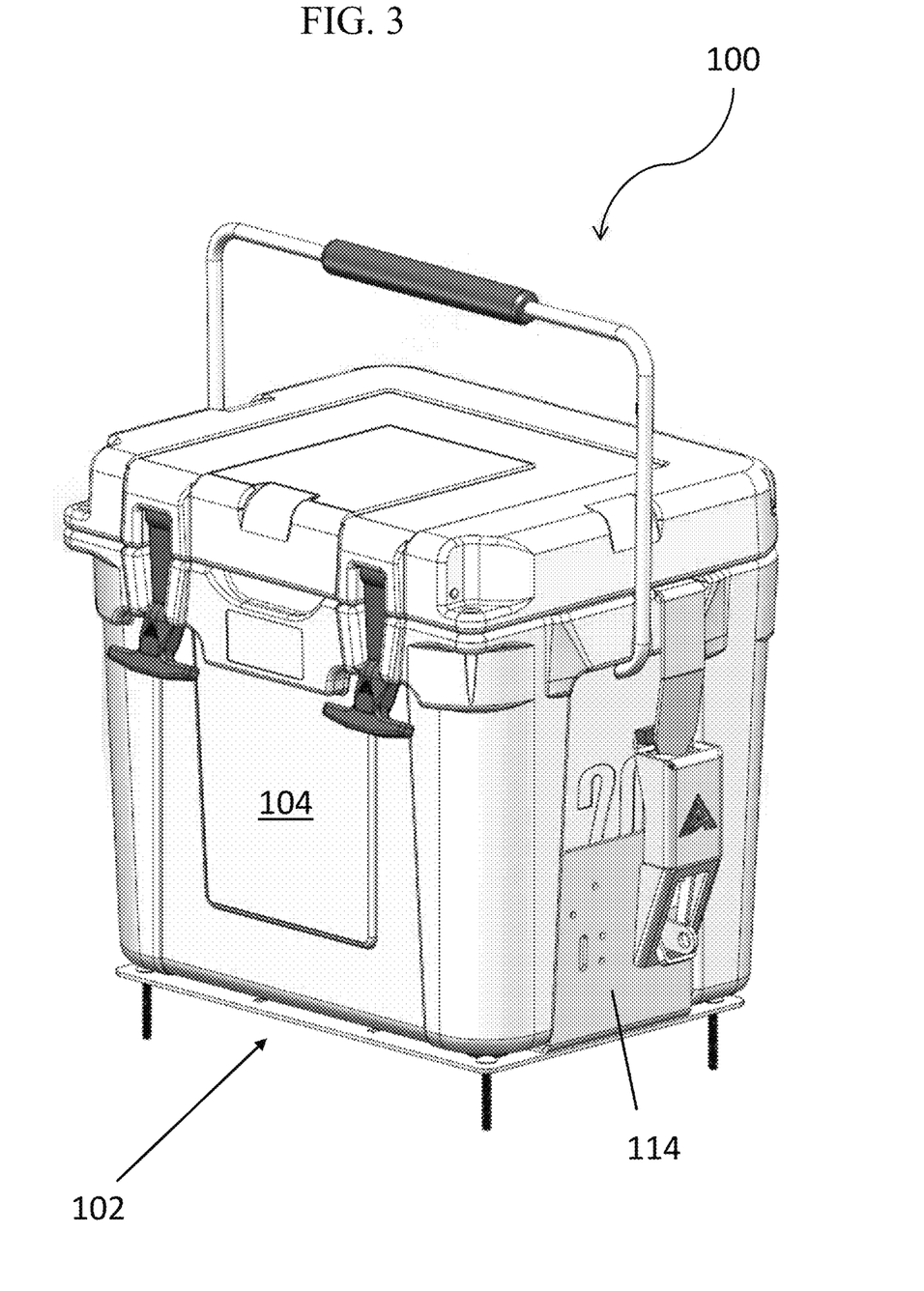
FIG. 3 is a perspective view of an alternative embodiment of a storage container securing system secured to an object in accordance with this disclosure.
Figure 4:
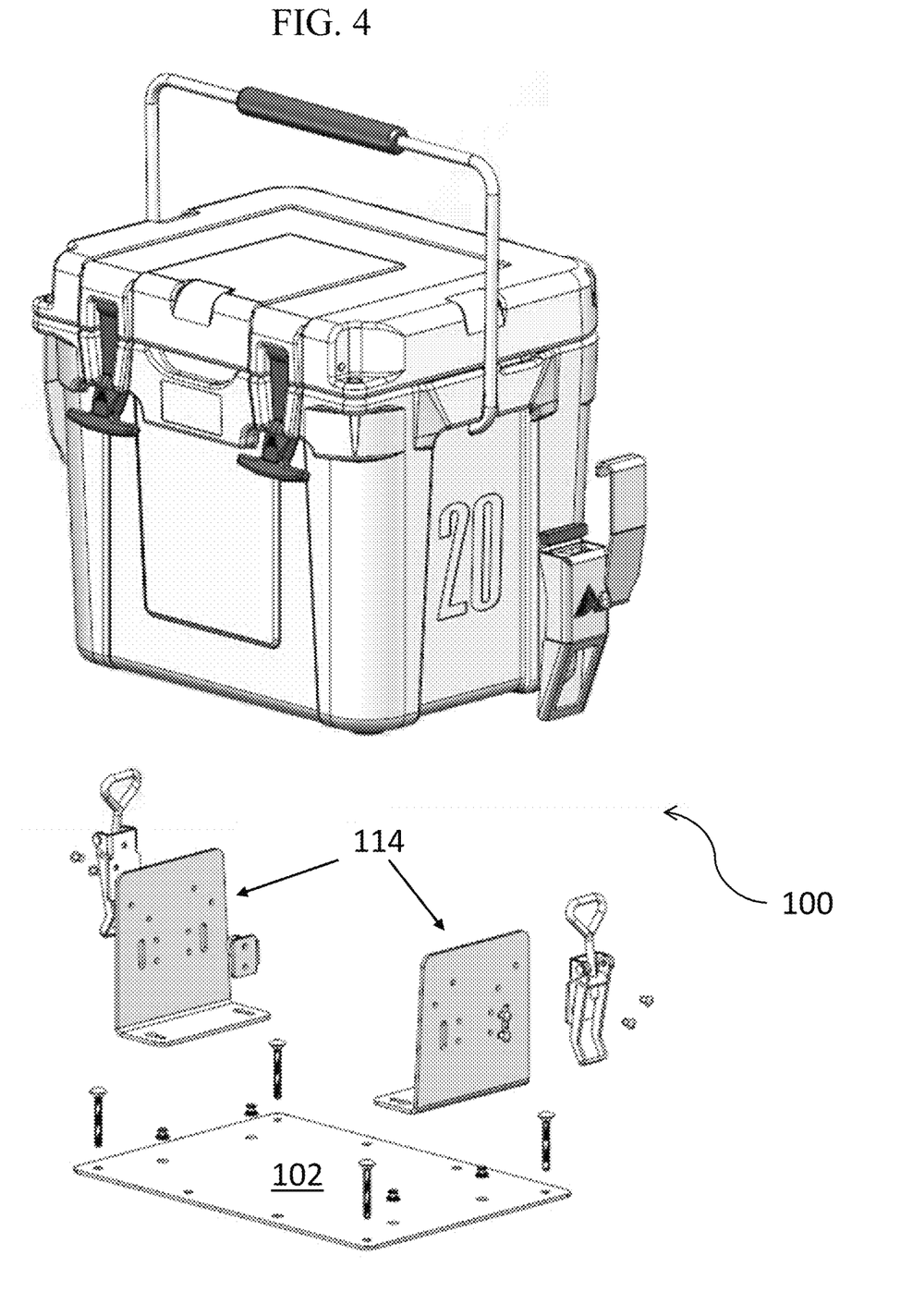
FIG. 4 is an exploded perspective view of the embodiment of FIG. 3.
Figure 5:
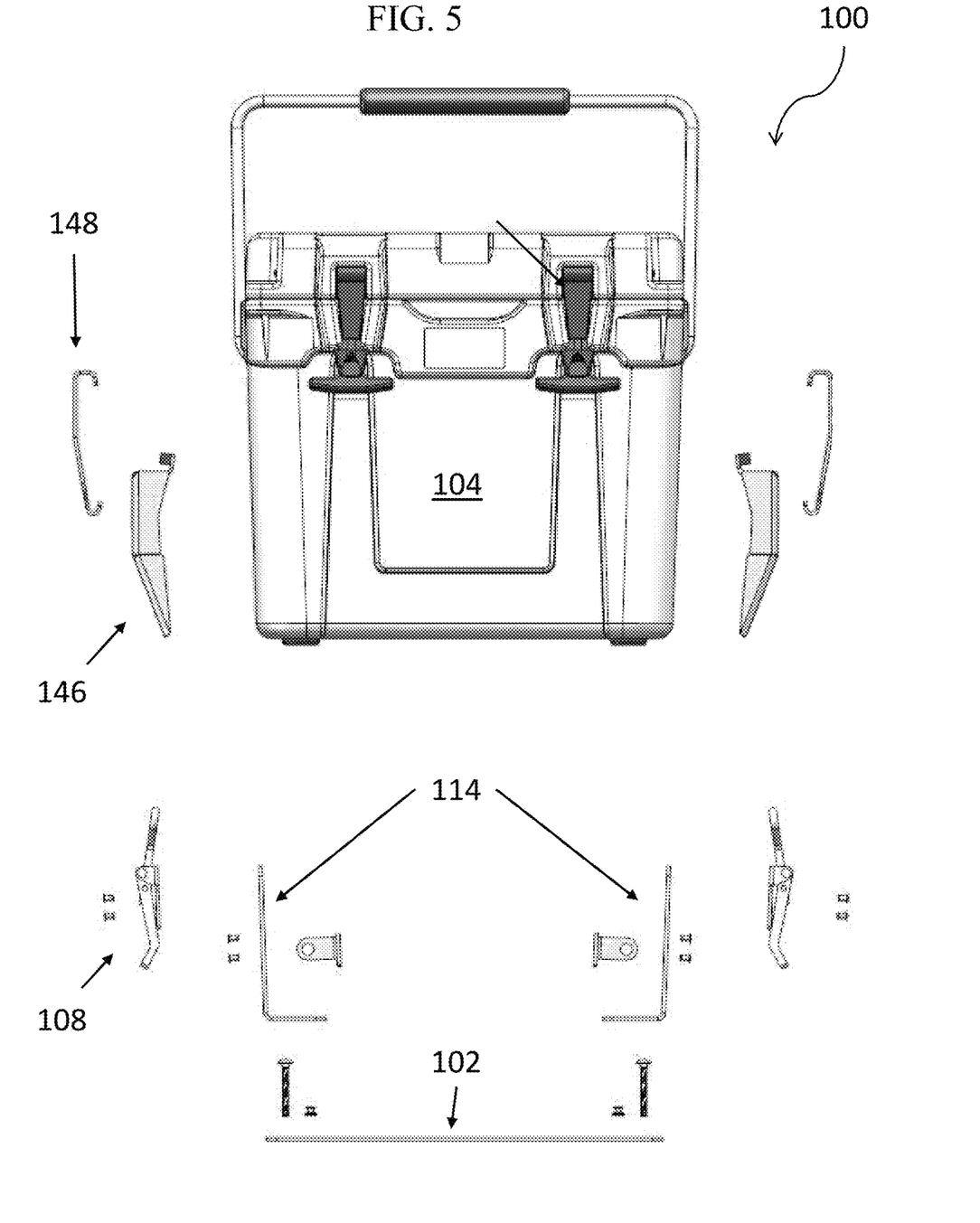
FIG. 5 is an exploded side view of the embodiment of FIG. 3.

Referring now to FIG. 3, a perspective view of an alternative embodiment of a securing system 100 is shown for securing a storage container, such as the one described in U.S. Pat. No. 8,925,752, entitled "Modular Cooler System," which is hereby incorporated by reference. Referring now to FIGS. 4 and 5, exploded views of the securing system 100 of FIG. 3 are provided. As can be seen, the base 102 in this embodiment is more rectangular and includes screws for being secured to a surface. In the embodiment shown, the storage securing system 100 comprises a base 102 having two container brackets 114 removably mounted on either end thereof. Each container bracket 114 has a coupling member 108 secured to an outer surface thereof. In various embodiments, the coupling member 108 may include a latch having a locking tab 148 on a distal end thereof.

Figure 6:
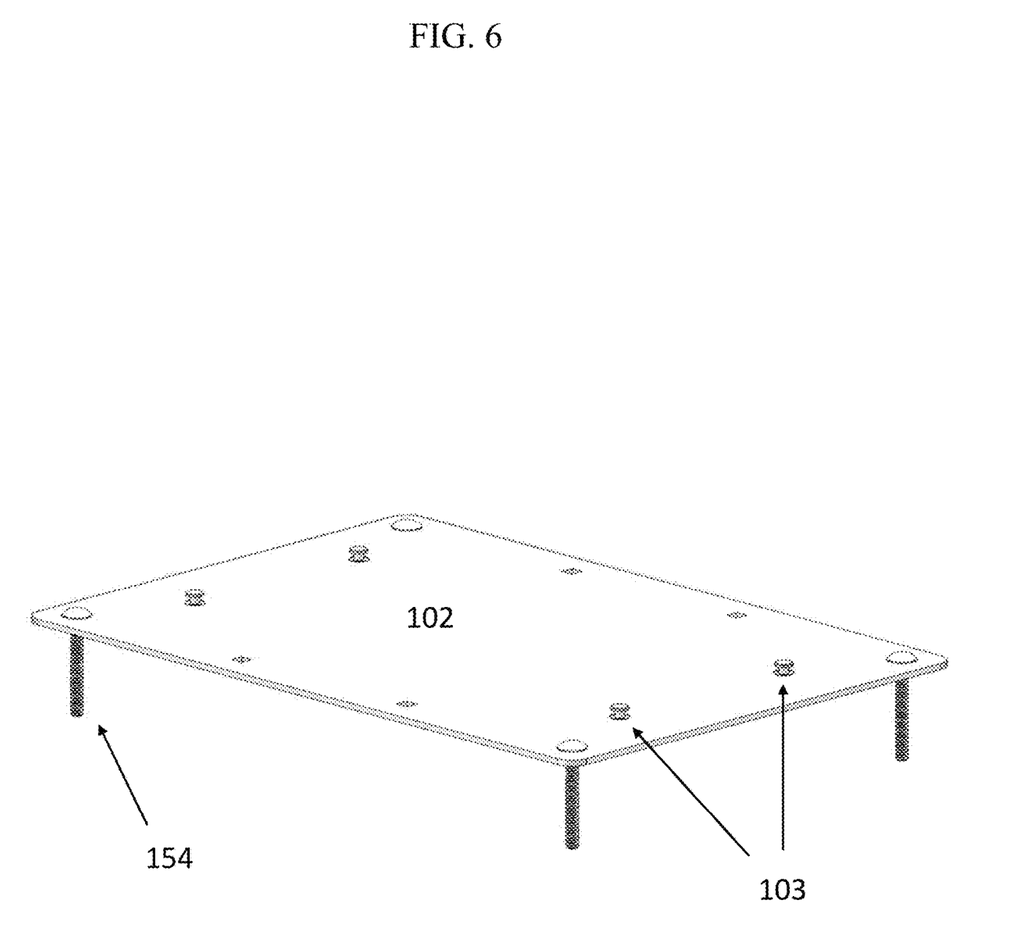
FIG. 6 is a perspective view of a base.
Figure 7:
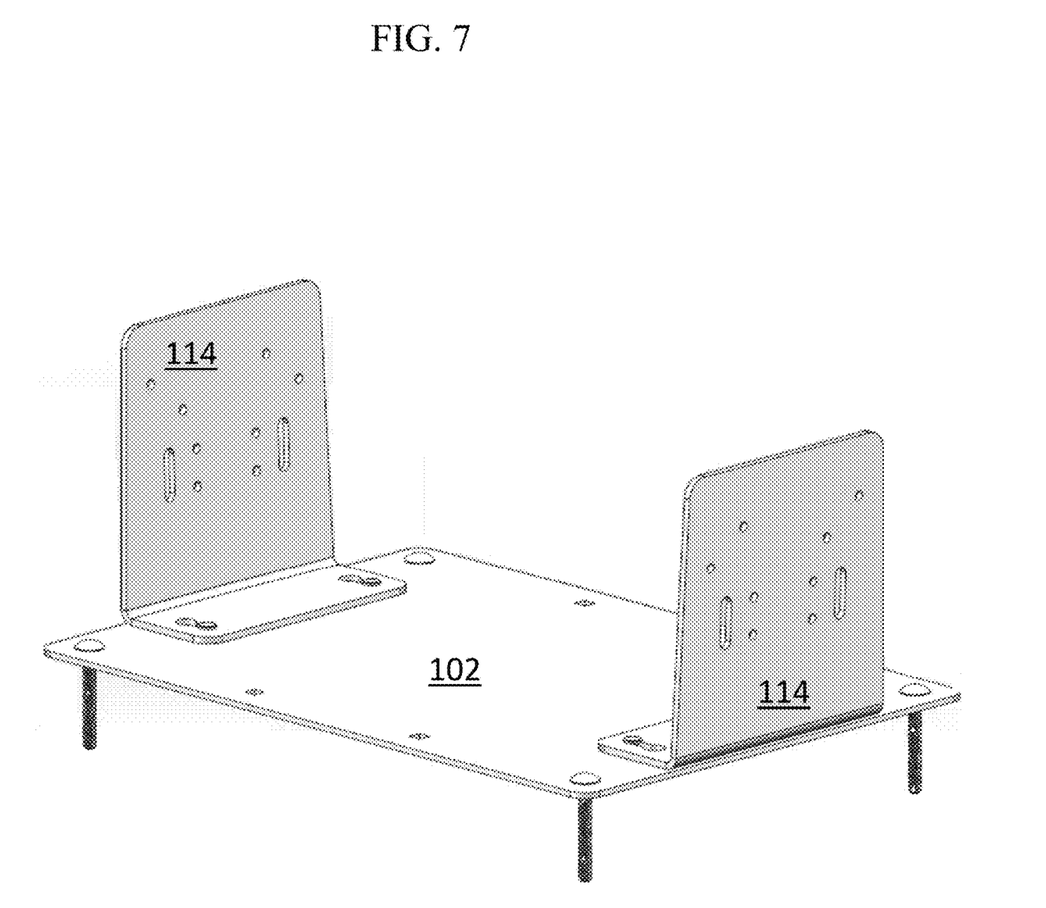
FIG. 7 is a perspective view of a base having container brackets mounted thereon.

Referring now to FIG. 6, an embodiment of a base 102 is shown for use in the storage securing system 100. In the embodiment shown, the base 102 of the storage securing system 100 comprises a plate having holes therethrough for bolts 154, screws, tabs, latches, or other securing devices to secure the base to a surface. In the embodiment shown, the base 102 also has protrusions 103 on opposite ends thereof. In various embodiments, the protrusions 103 may be movable, removable, slidable, or placed in other arrangements depending on the size and dimensions of the storage container to be secured. Referring now to FIG. 7, the base 102 is shown having two L-shaped mounting brackets 114 secured thereto. In the embodiment shown, the L-shaped mounting brackets 114 have two generally perpendicular surface, wherein a first surface abuts an upper surface of the base 102 and a second surface extends away from the upper surface of the base 102. In the embodiment shown, the first surface of the mounting bracket 114 has a plurality of keyholes therein for matingly engaging the protrusions in the upper surface of the base 102. In this way, the protrusions may be passed through the larger opening in the keyhole and slid towards the smaller opening of the keyhole. In use, a container placed between the two L-shaped brackets 114 would keep the L-shaped brackets from sliding inwardly. In some embodiments, the container brackets 114 may be integrally formed with the base 102 or may be secured thereto, such as by slots, welding, screws, or other securing device. In some embodiments, the container bracket 114 may be held in place by the storage container once it has been placed between the container brackets 114. In various embodiments, the base 102 may allow for adjustment to accommodate varying size storage containers. In various embodiments, the container brackets 114 may be secured within tracks to facilitate securement of storage containers of various sizes.

Figure 8:
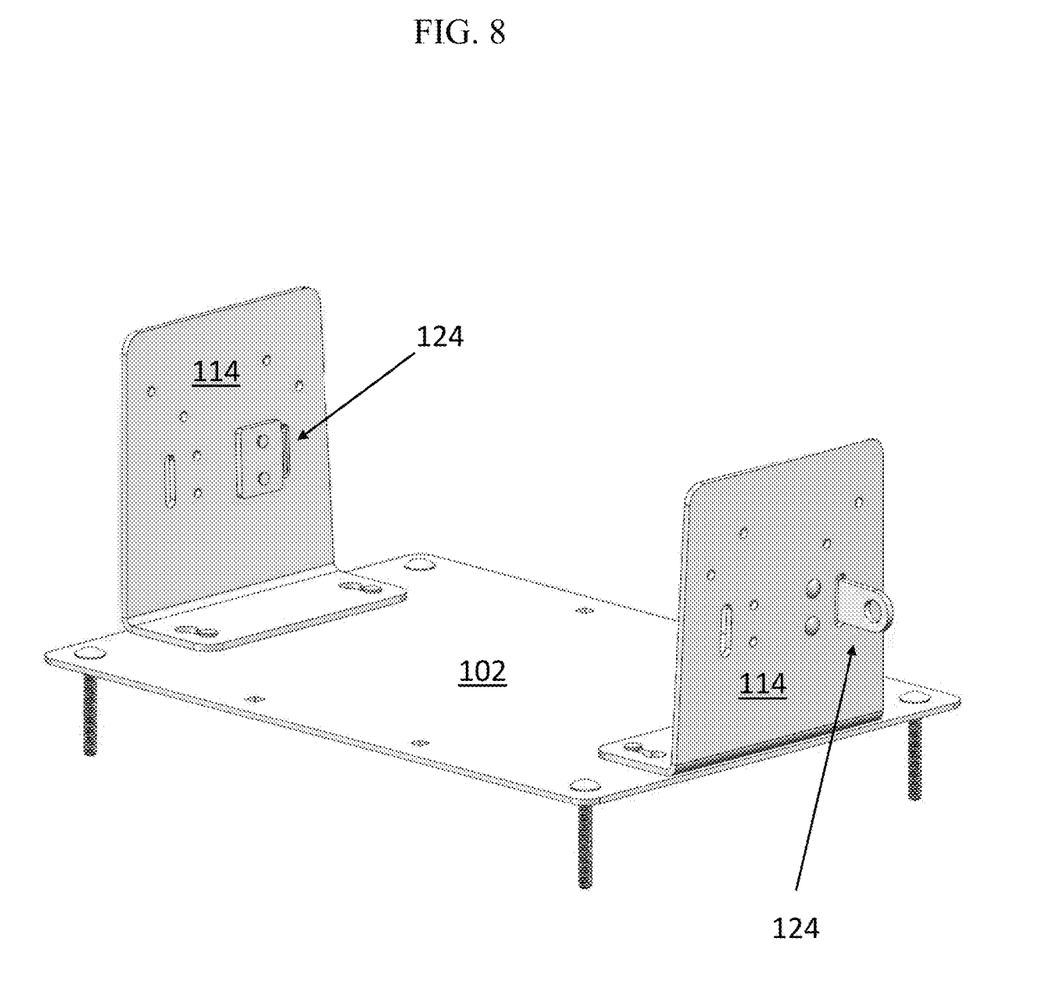
FIG. 8 is a perspective view of a base and two container brackets thereon, each container bracket having a securing members inserted therethrough.

Referring now to FIG. 8, the two mounting brackets 114 are shown mounted to the base 102 and having locking tabs 124 inserted therethrough. In the embodiment shown, the locking tab 124 has a flat portion adapted to abut an inner surface of the bracket 114 and a locking portion adapted to be inserted through a slot in the bracket 114. The locking portion may include an aperture for receiving a lock therethrough. In the embodiment shown, the locking tabs 124 are riveted to the brackets 114, but in other embodiments, they may be screwed, welded, bolted, or friction fit. As can be seen in the embodiment shown, the L-brackets 114 may have slots and holes thereabout to facilitate installation of the L-bracket 114 on either end of the base 102 and/or installation of the locking tabs 124 on either end of the L-bracket 114.

Figure 9:
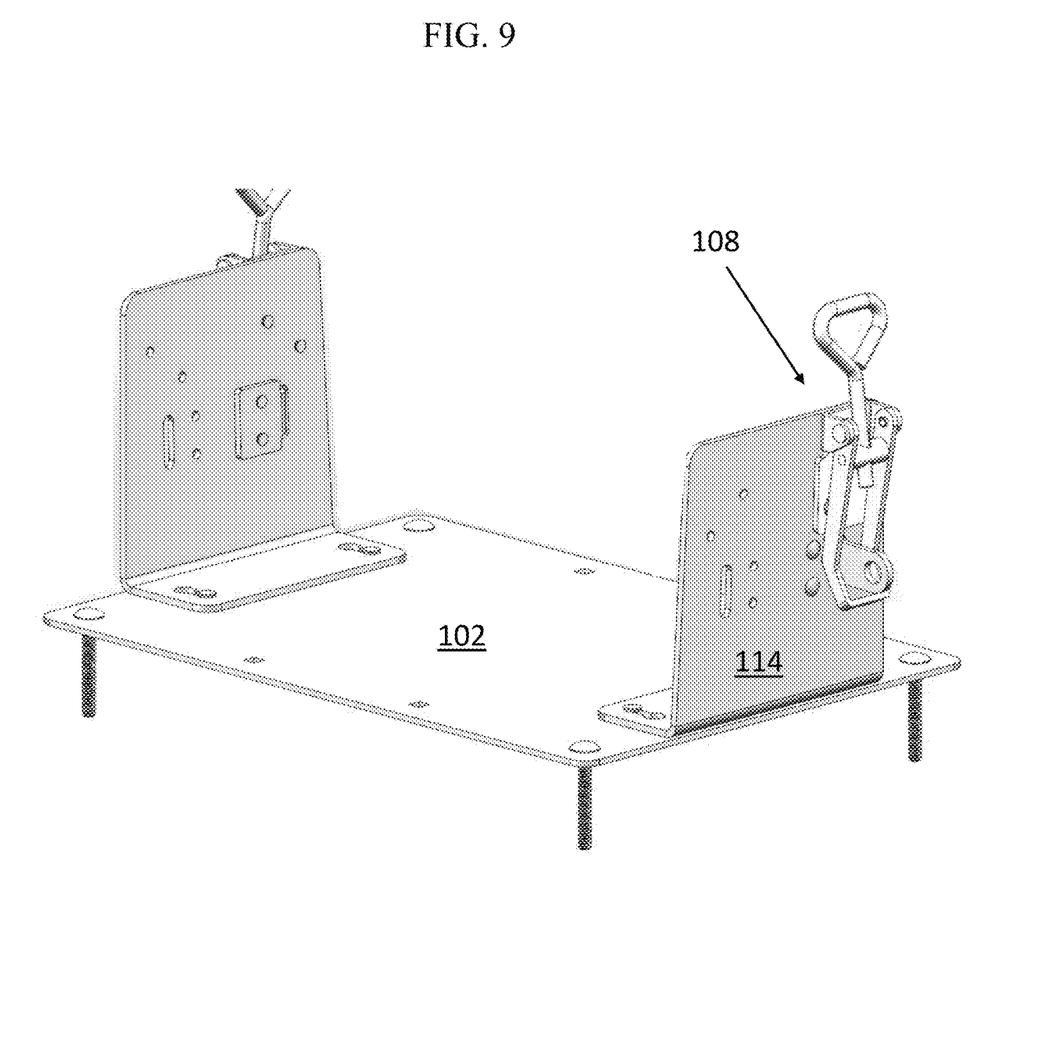
FIG. 9 is a perspective view of a storage container securing system in accordance with this disclosure.
Figure 10:
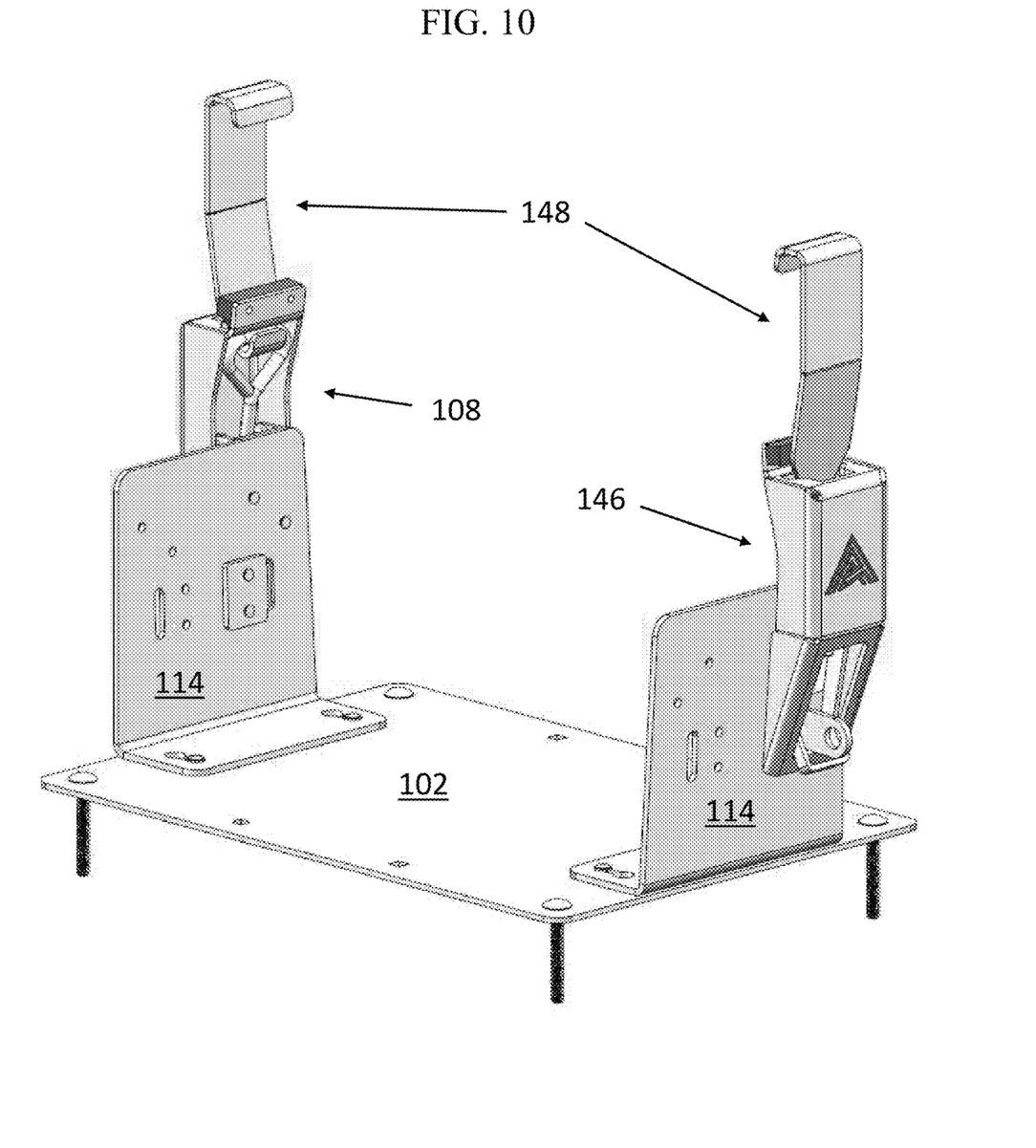
FIG. 10 is a perspective view of two container brackets and two coupling members of a storage container securing system in accordance with this disclosure.

Referring now to FIG. 9, the base 102 of the storage securing system has two container brackets 114 secured thereto, each having a securing tab inserted therethrough. In the embodiment shown, each mounting bracket 114 also has a coupling member 108 secured to an outer surface thereof. In the embodiment shown, the coupling member 108 is riveted to the container bracket 114, but in other embodiments, it may be welded, screwed, pinned, or other securing devices. In the embodiment shown, the coupling member 108 may be a latch. In the embodiment shown, the coupling members 108 are adapted to be held in a locked position by a pad lock or other locking device (not shown) being inserted through the aperture in the locking tab 124. Referring now to FIG. 10, the two container brackets 114 are shown with locking straps 148 and covers 146 over the coupling members 108. In use, the container brackets 114 are configured to receive a storage container therebetween. In some embodiments, the vertical surfaces of the brackets 114 may fit within recesses on opposite ends of the storage container. Once the storage container is located between the mounting brackets 114, an upper end of the locking straps 148 may be coupled to a lip, slot, protrusion, handle, edge or other surface of the container and a lower end may be coupled to the coupling members 108. One or both of the coupling members 108 may be rotated about a pivot pin and locked in place, for example with a lock or pin, to secure the storage container.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the inventions are not to be limited to the disclosed embodiments, but on the contrary, are intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A storage container securing system, comprising:
   a storage container;
   a base having a first set of protrusions and a second set of protrusions extending from a first surface thereof, the first set of protrusions being spaced apart from the second set of protrusions;
   a first L-shaped bracket having a first surface and a second surface, the first surface having a plurality of keyholes therein and configured to matingly engage the first set of protrusions;
   a second L-shaped bracket having a first surface and a second surface, the first surface having a plurality of keyholes therein and configured to matingly engage the second set of protrusions;
   first and second coupling members configured to secure the storage container when placed between the first and second L-shaped brackets, wherein the storage container has a right wall, an oppositely disposed left wall, and a pivotable lid therebetween;
   wherein the first and second coupling members are affixed to the first and second L-shaped brackets respectively and operative to secure the storage container therebetween by engaging an upper edge of the right and left walls of the storage container;
   wherein the upper edges of the right and left walls of the storage container are disposed below the lid of the storage container such that the lid may be opened and closed when the first and second coupling members engage the upper edges of the right and left walls.

2. The storage container securing system of claim 1, wherein the first and second coupling members each include an over-center latch having a mount portion affixed to the second surface of the respective first and second L-shaped brackets, a hook portion engaging the upper edge of the storage container, and a pivotable lever arm for closing and opening the coupling member.

3. The storage container securing system of claim 1, wherein a hook portion of the first and second coupling members is sized to fit within an indentation on the upper edge of the right and left walls of the storage container.

4. The storage container securing system of claim 1, wherein the base is configured to be removably mounted to a surface.

5. The storage container securing system of claim 1, wherein the second surfaces of the first and second L-shaped brackets are configured to secure the storage container in a lateral direction and the coupling members are configured to secure the storage container in a vertical direction.

6. The storage container securing system of claim 1, wherein the second surfaces of the first and second L-shaped brackets are sized and spaced to slide into recesses on the right and left walls of the storage container.

7. The storage container securing system of claim 1, wherein the lid of the storage container is configured to seal an interior chamber of the storage container when closed.

8. A storage container securing system, comprising:
   a storage container;
   a base;
   first and second L-shaped brackets having first and second surfaces, the first surface of the first and second L-shaped brackets configured to be mounted to opposite ends of the base and the second surface of the first and second L-shaped brackets being configured to abut opposite ends of the storage container when placed therebetween, each of the opposite ends of the storage container containing a recess on a lower portion thereof and the second surface of the first and second L-shaped brackets being configured to slidably fit within the recess;
   first and second latches secured to the first and second L-shaped brackets for securing the storage container by engaging an upper portion of each end of the storage container, wherein the storage container includes a pivotable lid and wherein the upper portion of each end of the storage container is disposed below the pivotable lid such that the lid may be pivoted between an opened position and a closed position while the first and second latches engage the upper portion; and
   wherein the base has a plurality of protrusions on an upper surface thereof and the first surface of the first and second L-shaped brackets has a plurality of keyholes therein configured to matingly engage a portion of the protrusions.

9. The storage container securing system of claim 8, wherein the first and second latches include an over-center latch having a mount portion affixed to the second surface of the first and second L-shaped brackets, a hook portion engaging the upper portion of the storage container, and a pivotable arm for closing and opening the latch.

10. The storage container securing system of claim 8, wherein the opposite ends of the storage container each include an indentation on the upper portion thereof, the first and second latches being sized to fit within the indentations.

11. The storage container securing system of claim 8, wherein the base is configured to be removably mounted to a surface.

12. The storage container securing system of claim 8, wherein the second surfaces of the first and second L-shaped brackets are configured to secure the storage container in a lateral direction and the first and second latches are configured to secure the storage container in a vertical direction.

13. A storage container securing system, comprising:
   a storage container having a right side, a left side opposite the right side, and a pivotable lid therebetween, the right side having a top end, a bottom end, and a recess in an outer surface thereof and the left side having a top end, a bottom end, and a recess in an outer surface thereof;
   a base having first and second brackets mounted thereon and extending upwardly therefrom, wherein the upwardly extending portions of the first and second brackets are configured to abut the right and left sides of the storage container when placed therebetween, the first bracket configured to fit within the recess on the right side of the storage container and the second bracket configured to fit within the recess on the left side of the storage container;
   first and second latches affixed to the first and second brackets for securing the storage container by engaging the top ends of the right and left sides of the storage container, wherein the lid may be pivoted between an open position and a closed position while the first and second latches engage the top ends; and wherein the base has a plurality of protrusions on an upper surface thereof and the first and second brackets have a plurality of keyholes therein configured to matingly engage the protrusions.

14. The storage container securing system of claim 13, wherein the first and second latches each include an over-center latch having a mount portion affixed to the first and second brackets, a hook portion engaging the top end of the right and left sides of the storage container, and a pivotable lever arm for closing and opening the first and second latches.

15. The storage container securing system of claim 13, wherein a hook portion of the first and second latches is sized to fit within an indentation on the top end of the right and left sides of the storage container.

16. The storage container securing system of claim 13, wherein the base is configured to be removably mounted to a surface.

17. The storage container securing system of claim 13, wherein the lid of the storage container is configured to seal an interior chamber of the storage container when in the closed position.

* * * * *